(12) United States Patent
Sato (10) Patent No.: US 10,086,801 B2
(45) Date of Patent: Oct. 2, 2018

(54) WASHER FLUID HEATING DEVICE

(71) Applicant: MURAKAMI CORPORATION, Shizuoka (JP)

(72) Inventor: Hidenori Sato, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 0 days.

(21) Appl. No.: 15/564,845

(22) PCT Filed: Aug. 5, 2016

(86) PCT No.: PCT/JP2016/073182
§ 371 (c)(1),
(2) Date: Oct. 6, 2017

(87) PCT Pub. No.: WO2017/026410
PCT Pub. Date: Feb. 16, 2017

(65) Prior Publication Data
US 2018/0105145 A1    Apr. 19, 2018

(30) Foreign Application Priority Data
Aug. 11, 2015    (JP) .................................. 2015-158738

(51) Int. Cl.
*A47J 27/00*   (2006.01)
*F24H 1/18*    (2006.01)
(Continued)

(52) U.S. Cl.
CPC .......... *B60S 1/488* (2013.01); *B60H 1/00271* (2013.01); *F24H 1/121* (2013.01)

(58) Field of Classification Search
None
See application file for complete search history.

(56) References Cited

U.S. PATENT DOCUMENTS 4,409,958 A * 10/1983 Fillios ................. F24D 19/1051
                                                     122/14.1
4,508,957 A *  4/1985 Rocchitelli ............. B60S 1/481
                                                     137/341
(Continued)

FOREIGN PATENT DOCUMENTS

JP        2743395        2/1998
JP        5536680        5/2014

OTHER PUBLICATIONS

Search Report issued in International Bureau of WIPO Patent Application No. PCT/JP2016/073182, dated Aug. 30, 2016.
(Continued)

*Primary Examiner* — Thor Campbell
(74) *Attorney, Agent, or Firm* — Greenblum & Bernstein, P.L.C.

(57) ABSTRACT

A washer fluid heating device includes a container that contains a washer fluid, a lid portion attached to a first end of the container in a direction of a central axis to face an accommodation space for the washer fluid, a heating unit that has a proximal end portion attached to the lid portion and extends toward the accommodation space, and an outflow pipe disposed in the accommodation space to allow the washer fluid in the accommodation space to flow out. The outflow pipe includes a first outlet provided at a position between a second end opposite to the first end of the container and the heating unit, the position being separated from the second end, and a second outlet provided at a position between a side wall of the container and the heating unit, the position being separated from the side wall.

15 Claims, 7 Drawing Sheets

(51) Int. Cl.
  *B60S 1/48*  (2006.01)
  *B60H 1/00*  (2006.01)
  *F24H 1/12*  (2006.01)

(56) References Cited

U.S. PATENT DOCUMENTS

| | | | | |
|---|---|---|---|---|
| 4,514,617 A * | 4/1985 | Amit | ............ | F24H 1/20 |
| | | | | 122/18.4 |
| 4,637,347 A * | 1/1987 | Troy | ............ | F24D 3/082 |
| | | | | 122/15.1 |
| 5,848,636 A * | 12/1998 | Chuang | ............ | F28D 7/06 |
| | | | | 165/74 |
| 5,957,384 A * | 9/1999 | Lansinger | ............ | B60S 1/481 |
| | | | | 219/202 |
| 5,979,796 A * | 11/1999 | Ponziani | ............ | B60S 1/52 |
| | | | | 219/202 |
| 6,839,509 B2 * | 1/2005 | Kuebler | ............ | B60S 1/488 |
| | | | | 137/334 |
| 7,588,194 B2 * | 9/2009 | Shank | ............ | B05B 9/002 |
| | | | | 239/130 |
| 7,634,976 B2 * | 12/2009 | Gordon | ............ | F24H 9/124 |
| | | | | 122/14.3 |
| 7,657,961 B2 * | 2/2010 | Shank | ............ | B05B 9/002 |
| | | | | 15/250.01 |
| 7,673,814 B2 * | 3/2010 | Shank | ............ | B05B 9/002 |
| | | | | 219/202 |
| 7,959,090 B2 * | 6/2011 | Shank | ............ | B05B 9/002 |
| | | | | 239/130 |
| 2012/0183281 A1 | 7/2012 | Sato et al. | | |

OTHER PUBLICATIONS

International Preliminary Report on Patentability issued in PCT/JP2016/073182, and English language translation thereof dated Feb. 22, 2018.

International Preliminary Report on Patentability issued in PCT/JP2016/07318, and English language translation thereof dated Feb. 22, 2018.

* cited by examiner

WASHER FLUID HEATING DEVICE

TECHNICAL FIELD

The present disclosure relates to a washer fluid heating device.

BACKGROUND ART

Conventionally, a washer fluid heating device has been mounted on a vehicle, etc. to remove frost in winter. For example, Patent Literature 1 describes a washer fluid heating device having a structure in which a heating chamber is accommodated in a heat-retaining hot water storage chamber and an electric heater is accommodated inside the heating chamber. In this heating device, a washer fluid in the heat-retaining hot water storage chamber may be allowed to flow into the heating chamber by opening an outflow passage for the washer fluid at an upper part of the heating chamber. After the washer fluid is heated by the electric heater inside the heating chamber, the washer fluid is supplied to a washer nozzle by driving of a washer pump and sprayed from the washer nozzle. In addition, Patent Literature 2 describes a vehicular washer device including a heating and heat insulating device that heats a washer fluid and keeps the washer fluid warm. This device is provided with an outlet that allows the washer fluid to flow out and a gas phase removal pipe for discharging gas.

CITATION LIST

Patent Literature

Patent Literature 1: Japanese Patent No. 5536680
Patent Literature 2: Japanese Patent No. 2743395

SUMMARY OF INVENTION

Technical Problem

In a configuration in which an outflow passage is open in a heating chamber of a washer fluid heating device, an air layer may be formed at an upper side of the washer fluid. In this case, there is a possibility that a distal end portion of a heater will be exposed from the washer fluid when a vehicle is inclined while the washer fluid heating device is turned ON or the washer fluid heating device is obliquely mounted. This exposed distal end portion gets into a so-called no-water burning state. When the no-water burning state is caused, a life of the heater is affected.

Meanwhile, in a cold district, the washer fluid may freeze while the washer fluid heating device is turned OFF. In particular, in a case in which concentration of the washer fluid is low and close to water or a freezing temperature of the washer fluid is high, there is a concern that the washer fluid heating device may be damaged by the freezing and expanding washer fluid when the washer fluid is placed under a freezing point while the washer fluid heating device is turned OFF for a long period of time at night, etc.

The present disclosure describes a washer fluid heating device capable of assigning a degree of freedom to a direction of an installed container and preventing damage to the container at the time of freeze.

Solution to Problem

A washer fluid heating device according to an aspect of the present disclosure includes a container that contains a washer fluid, a lid portion attached to a first end of the container in a direction of a central axis to face an accommodation space for the washer fluid, a heating unit that has a proximal end portion attached to the lid portion and extends toward the accommodation space, and an outflow pipe disposed in the accommodation space to allow the washer fluid in the accommodation space to flow out, in which the outflow pipe includes a first outlet provided at a position between a second end opposite to the first end of the container and the heating unit, the position being separated from the second end, and a second outlet provided at a position between a side wall of the container and the heating unit, the position being separated from the side wall.

According to this washer fluid heating device, the outflow pipe disposed in the accommodation space of the container includes the first outlet and the second outlet. Since the first outlet is provided between the second end of the container and the heating unit, a position of the first outlet is higher than a position of the second outlet and the washer fluid flows out from the first outlet and the second outlet when the container is installed such that the central axis of the container extends along the vertical direction. As a result, when the container is vertically disposed and used, a liquid level is formed around the first outlet, and exposure of the heating unit may be prevented. Therefore, no-water burning is prevented. In addition, in this case, since the first outlet is provided at a position separated from the second end, a space is formed between the liquid level and the second end. Therefore, damage to the container is prevented even when the washer fluid in the accommodation space freezes and expands. Further, since the second outlet is provided between the side wall of the container and the heating unit, the position of the second outlet is higher than the position of the first outlet and the washer fluid flows out from the first outlet and the second outlet when the container is installed such that the central axis of the container extends along the horizontal direction. As a result, when the container is horizontally disposed and used, a liquid level is formed around the second outlet, and exposure of the heating unit may be prevented. Therefore, no-water burning is prevented. In addition, in this case, since the second outlet is provided at a position separated from the side wall, a space is formed between the liquid level and the side wall. Therefore, damage to the container is prevented even when the washer fluid in the accommodation space freezes and expands. As described above, according to the above-described washer fluid heating device, it is possible to assign a degree of freedom to a direction of the installed container and prevent damage at the time of freeze.

In the washer fluid heating device, the first outlet may be provided at a position overlapping a region obtained by projecting a distal end portion of the heating unit in the direction of the central axis. According to this configuration, when the container is vertically placed and used, and the container is further tilted due to, for example, inclination of a vehicle or a road, the liquid level is easily formed at a higher position than that of the heating unit. Therefore, exposure of the heating unit is prevented.

In the washer fluid heating device, the second outlet may be provided between the side wall and a central portion of the heating unit in an extending direction. According to this configuration, when the container is horizontally placed and used, and the container is further tilted due to, for example, inclination of the vehicle or the road, the liquid level is easily formed at a higher position than that of the heating unit. Therefore, exposure of the heating unit is prevented.

In the washer fluid heating device, when the container is installed such that the central axis extends along a vertical direction, the first outlet may be provided such that a space formed between a horizontal plane passing through the first outlet and the second end corresponds to 10% or more of a volume of the accommodation space. According to this configuration, when the container is vertically placed and used, an air layer corresponding to 10% or more of the volume of the accommodation space is formed in the accommodation space of the container. Therefore, damage to the container is reliably prevented even when the washer fluid in the accommodation space freezes and expands.

In the washer fluid heating device, when the container is installed such that the central axis extends along a horizontal direction, the second outlet may be provided such that a space formed between a horizontal plane passing through the second outlet and the side wall corresponds to 10% or more of the volume of the accommodation space. According to this configuration, when the container is horizontally placed and used, an air layer corresponding to 10% or more of the volume of the accommodation space is formed in the accommodation space of the container. Therefore, damage to the container is reliably prevented even when the washer fluid in the accommodation space freezes and expands.

Advantageous Effects of Invention

According to the present disclosure, it is possible to assign a degree of freedom to a direction of an installed container and prevent damage at the time of freeze.

DESCRIPTION OF EMBODIMENTS

Hereinafter, an embodiment of the present disclosure will be described with reference to drawings. In description of the drawings, the same reference numeral will be assigned to the same element, and a repeated description will be omitted.

Figure 1:
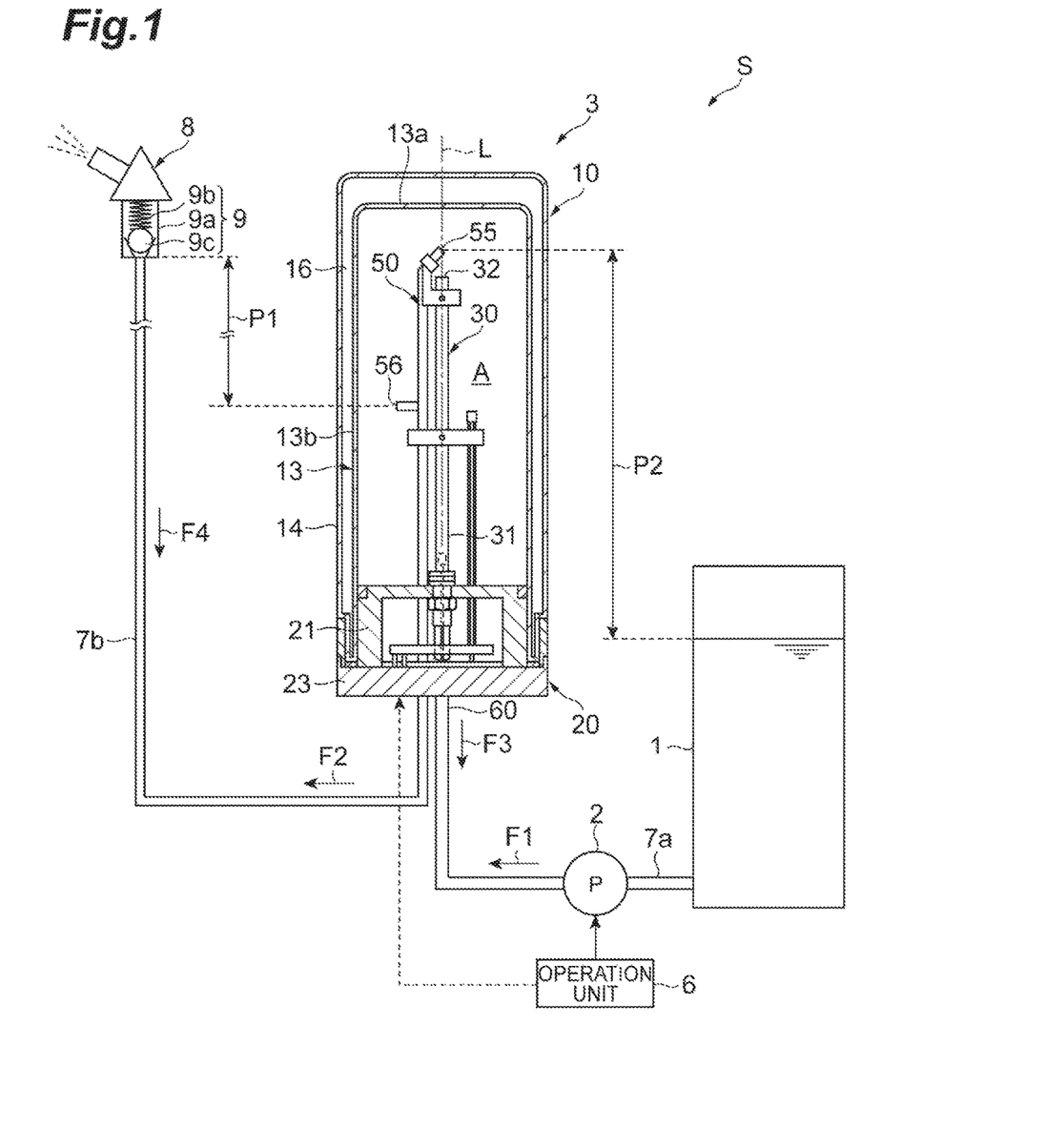
FIG. 1 is a diagram schematically illustrating a washer fluid supply system using an embodiment of the present disclosure.

Hereinafter, a description will be given of an example in which a washer fluid heating device 3 according to an embodiment of the present disclosure is applied to a washer fluid supply system of a vehicle. As illustrated in FIG. 1, a washer fluid supply system S includes a washer fluid tank 1 that stores a washer fluid, a washer fluid pump 2 provided at an outlet side of the washer fluid tank 1, and a washer fluid nozzle 8 provided to face a front windshield of the vehicle. The supply system S further includes the washer fluid heating device 3 provided between the washer fluid pump 2 and the washer fluid nozzle 8. An operation unit 6 is connected to the washer fluid pump 2 and the washer fluid heating device 3. The washer fluid pump 2 may be operated when the operation unit 6 is operated by a driver of the vehicle, etc.

The washer fluid tank 1 and the heating device 3 are connected by a first pipe line 7a. The washer fluid pump 2 is provided on the first pipe line 7a. The heating device 3 and the washer fluid nozzle 8 are connected by a second pipe line 7b. A check valve (reverse flow prevention mechanism) 9 for applying a predetermined pressure to a washer fluid in an accommodation space A through the second pipe line 7b is provided between a distal end of the second pipe line 7b and the washer fluid nozzle 8. The check valve 9 includes a housing 9a, a ball 9c capable of sealing the distal end of the second pipe line 7b, and a spring (urging means) 9b that presses the ball 9c to the second pipe line 7b side with a predetermined pressing force. The spring 9b and the ball 9c are accommodated in the housing 9a. The washer fluid is sprayed from the washer fluid nozzle 8 when a discharge pressure by the washer fluid pump 2 exceeds a pressing force by the check valve 9.

Figure 2:
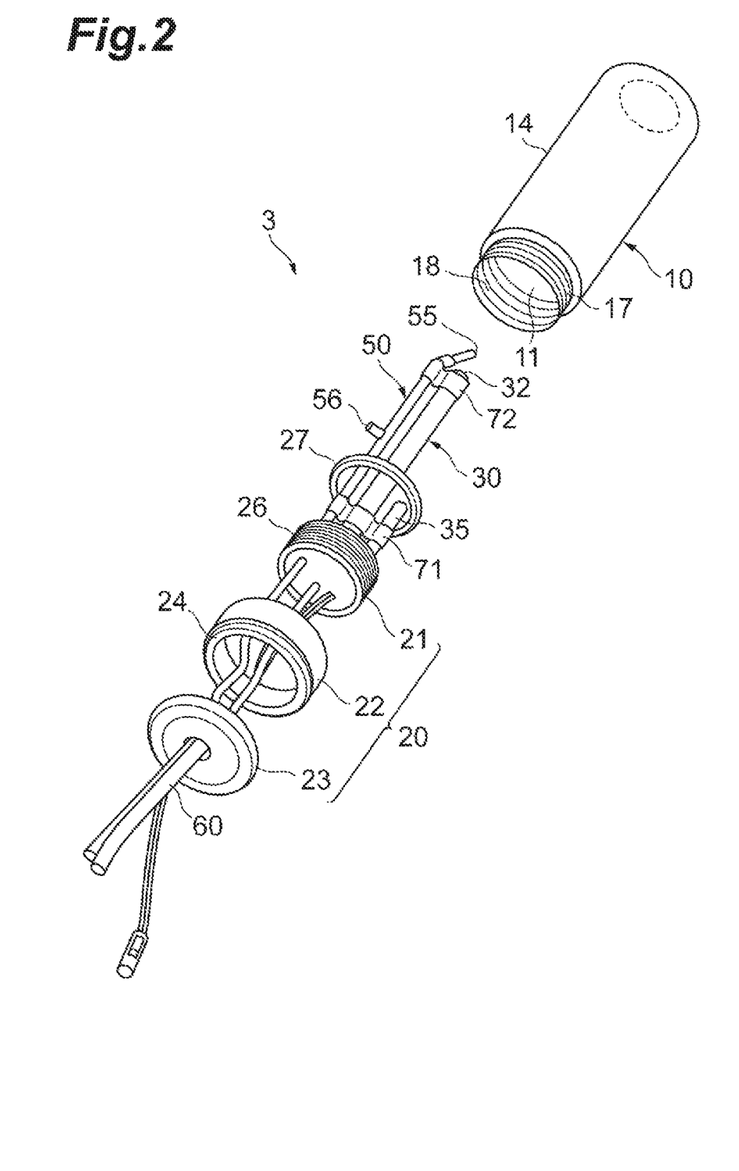
FIG. 2 is an exploded perspective view illustrating a washer fluid heating device of FIG. 1.
Figure 3:
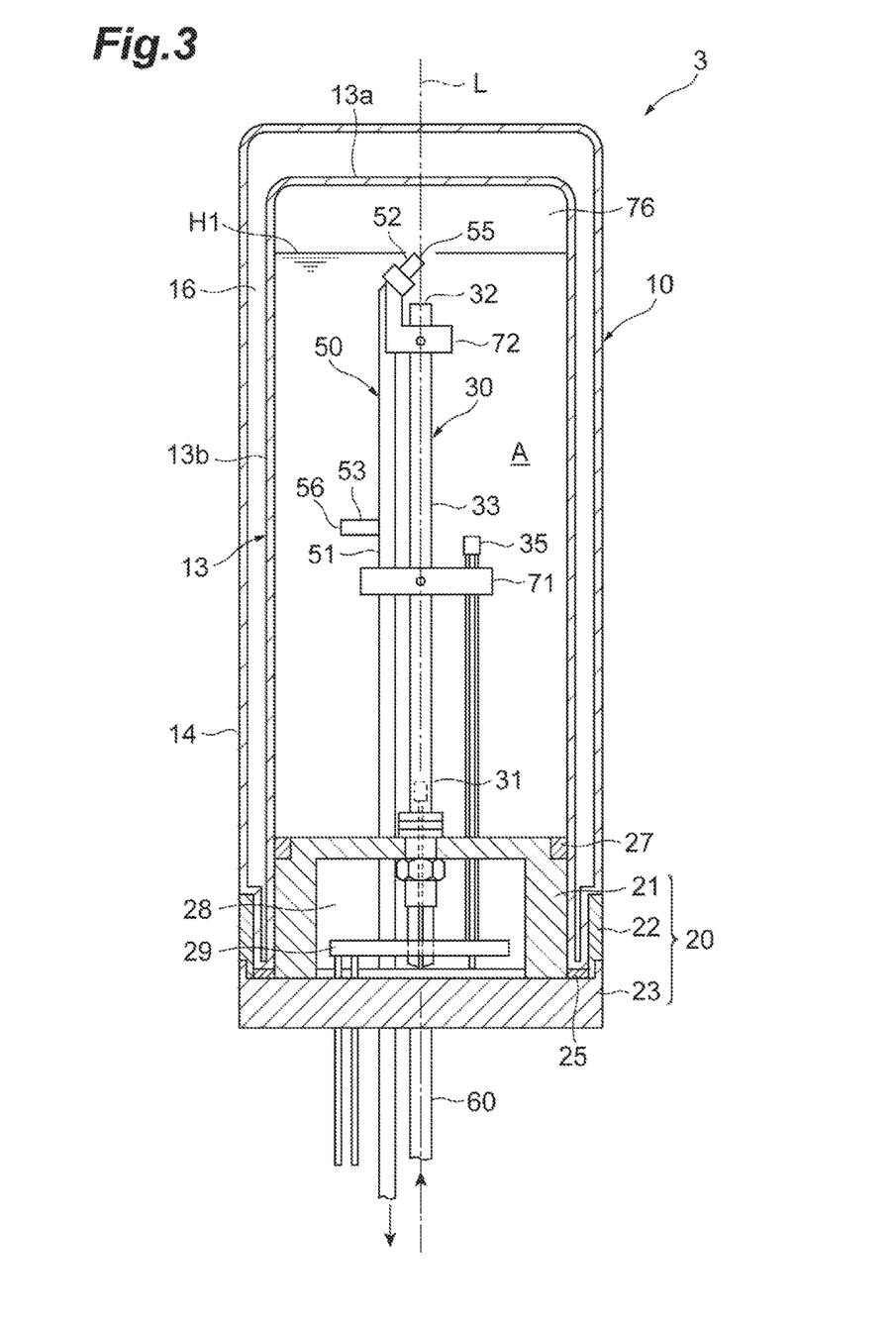
FIG. 3 is a cross-sectional view illustrating the washer fluid heating device of FIG. 1.

As illustrated in FIG. 1 to FIG. 3, the washer fluid heating device 3 includes a cylindrical container 10, a lid portion 20 attached to a first end of the container 10 in a direction of a central axis L to close an opening 11 of the container 10, and a heater (heating unit) 30 attached to the lid portion 20. The container 10 has an accommodation space A that contains the washer fluid. A proximal end portion 31 of the heater 30 is attached to the lid portion 20. The heater 30 extends toward the accommodation space A of the container 10. Here, the proximal end portion 31 of the heater 30 is a portion of the heater 30 on the first end side in the direction of the central axis L.

The container 10 is fixed inside the vehicle. The container 10 has a double structure similar to that of a thermos bottle and has a heat insulating structure for keeping the washer fluid in the accommodation space A warm. For example, an inner wall 13 of the container 10 is made of metal such as stainless steel, glass plated with metal, etc. An outer wall 14 of the container 10 is made of metal such as stainless steel. A vacuum layer 16 is formed between the inner wall 13 and the outer wall 14. At the first end of the container 10 at which the opening 11 is formed, a screw portion 17 is formed on an outer peripheral surface thereof and a screw portion 18 is formed on an inner peripheral surface thereof.

The lid portion 20 faces the accommodation space A for the washer fluid and seals the accommodation space A. The lid portion 20 includes an inner plug 21 facing the accommodation space A, a cover 22 attached to the screw portion 17 provided on the outer peripheral surface of the opening 11, and an outer lid 23 attached to the cover 22 to cover a lower surface of the inner plug 21. The outer lid 23 is attached to the cover 22 by being screwed into a screw portion 24 formed on a lower side of an outer peripheral surface of the cover 22. Annular packing 25 (see FIG. 3) is provided between the outer lid 23 and an end surface of the container 10 on the opening 11 side. For example, each member included in the lid portion 20 is made of a resin such as polyphenylene sulfide (PPS), polypropylene (PP), etc.

A screw portion 26 is formed on an outer peripheral surface of the inner plug 21. The inner plug 21 is attached to the container 10 by screwing the screw portion 26 and the screw portion 18 of the opening 11 of the container 10. A groove portion for mounting packing 27 is formed along an outer peripheral portion thereof on an upper surface of the inner plug 21. The opening 11 of the accommodation space A is sealed by the inner plug 21 and the packing 27. A depression 28 which is recessed to the accommodation space A side and open downward is formed in the inner plug 21. The depression 28 is filled with a resin such as urethane, and a control board 29 is buried therein.

The heater 30 is mounted by a proximal end portion 31 thereof penetrating the inner plug 21. The heater 30 extends toward a second end side of the container 10 opposite to the lid portion 20. An axis of the heater 30 is located on the central axis L of the container 10. A distal end portion 32 is formed at a distal end side of the heater 30 in an axis direction.

A temperature sensor 35 is provided around a central portion of the accommodation space A in an extending direction. The temperature sensor 35 is connected to the control board 29 accommodated in the depression 28 of the inner plug 21 by a lead wire. The temperature sensor 35 measures a temperature around the central portion of the accommodation space A. The temperature sensor 35 may measure a temperature, and examples thereof include a thermistor, a thermocouple, etc. The temperature sensor 35 measures a temperature of the washer fluid in the accommodation space A and outputs the measured temperature to the control board 29. The temperature of the washer fluid in the accommodation space A is maintained at a desired temperature (for example, about 40° C.) by controlling ON/OFF of the heater 30 based on the temperature measured by the temperature sensor 35.

The container 10 is provided with an outflow pipe 50 for allowing the washer fluid to flow out and an inflow pipe 60 for allowing the washer fluid to flow in. The outflow pipe 50 is connected to the washer fluid nozzle 8 through the second pipe line 7b. The outflow pipe 50 and the inflow pipe 60 penetrate the lid portion 20 to extend in the accommodation space A. The inflow pipe 60 is connected to the washer fluid pump 2 through the first pipe line 7a.

The outflow pipe 50 extends along the heater 30 disposed on the central axis L. In other words, the outflow pipe 50 extends parallel to the central axis L. Arrangement of the outflow pipe 50 in the container 10 may be appropriately changed. A central portion 51 of the outflow pipe 50 in an extending direction is fixed by a first holder 71 attached to the heater 30. A distal end portion 52 of the outflow pipe 50 extends to be inclined with respect to the central axis L. The distal end portion 52 is fixed by a second holder 72 attached to the distal end portion of the heater 30.

As illustrated in FIG. 3, the outflow pipe 50 has a first outlet 55 and a second outlet 56, which are two outlets for allowing the washer fluid to flow out. When the heating device 3 includes these two outlets, the heating device 3 may be used without hindrance in any of a case in which the container 10 is vertically placed (that is, the container 10 is installed such that the central axis L extends along a vertical direction) and a case in which the container 10 is horizontally placed (that is, the container 10 is installed such that the central axis L extends along a horizontal direction). The terms "vertically placed" and "horizontally placed" mean not only cases in which the central axis L of the container 10 is directed in the vertical direction and the horizontal direction, but also cases in which the container 10 is installed such that the central axis L of the container 10 is inclined by a predetermined angle (an acute angle) with respect to the vertical direction and the horizontal direction. Hereinafter, a description will be given of configurations of the first outlet 55 and the second outlet 56.

The first outlet 55 functions as an outlet for the washer fluid when the container 10 is vertically placed. The first outlet 55 is an opening formed at a distal end of the outflow pipe 50 and is positioned between the distal end portion 32 of the heater 30 and an end wall 13a of the inner wall 13 (inner wall surface on the second end side of the container 10). The first outlet 55 is located around an upper portion of the distal end portion 32 and located on the central axis L of the container 10. In other words, the first outlet 55 is provided at a position overlapping a region obtained by projecting the distal end portion 32 of the heater 30 in the direction of the central axis L.

The first outlet 55 is provided at a position separated from the end wall 13a. That is, the first outlet 55 is separated from the end wall 13a by a certain distance in the direction of the central axis L. The first outlet 55 is located at a position at which the washer fluid corresponds to 90% or less of a volume of the accommodation space A in the direction of the central axis L of the container 10. That is, when the container 10 is vertically placed, a flat cylindrical space 76 formed by a horizontal plane passing through the first outlet 55 and the end wall 13a of the accommodation space A on the second end side corresponds to 10% or more of the volume of the accommodation space A. This space 76 corresponds to an air layer on the upper side of the washer fluid when the container 10 is vertically placed.

When the container 10 is vertically placed, a liquid level H1 of the washer fluid stored in the accommodation space A of the container 10 substantially matches the horizontal plane passing through the first outlet 55. The liquid level of the washer fluid stored in the accommodation space A of the container 10 refers to a normal water level of the washer fluid when the washer fluid pump 2 is in an OFF state. The space 76 corresponding to 10% or more of the volume of the accommodation space 62 is formed between the liquid level H1 and the end wall 13a on the second end side of the container 10.

Figure 4A:
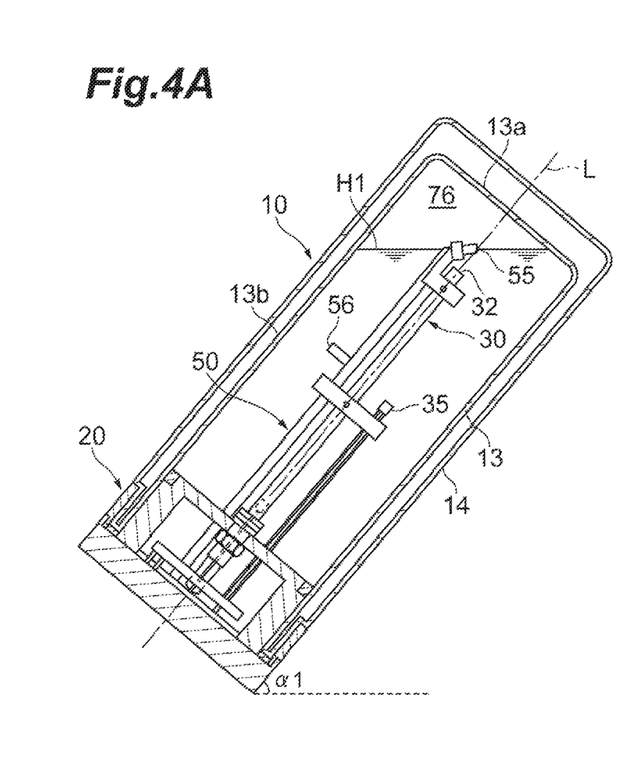
FIGS. 4A and 4B are cross-sectional views illustrating an example of a state in which the washer fluid heating device is inclined.

FIG. 4A illustrates a state in which the container 10 is inclined by an angle α1, for example, 40° with respect to the horizontal plane. In this case, the distal end portion 32 of the heater 30 is located below the liquid level H1 of the washer fluid and is not exposed from the liquid level H1 of the washer fluid. The liquid level H1 of the washer fluid may be maintained without change. However, the liquid level H1 of the washer fluid may be formed to pass through the first outlet 55 due to air entering the container 10. In this case, the distal end portion 32 of the heater 30 is located below the liquid level H1 of the washer fluid.

Figure 4B:
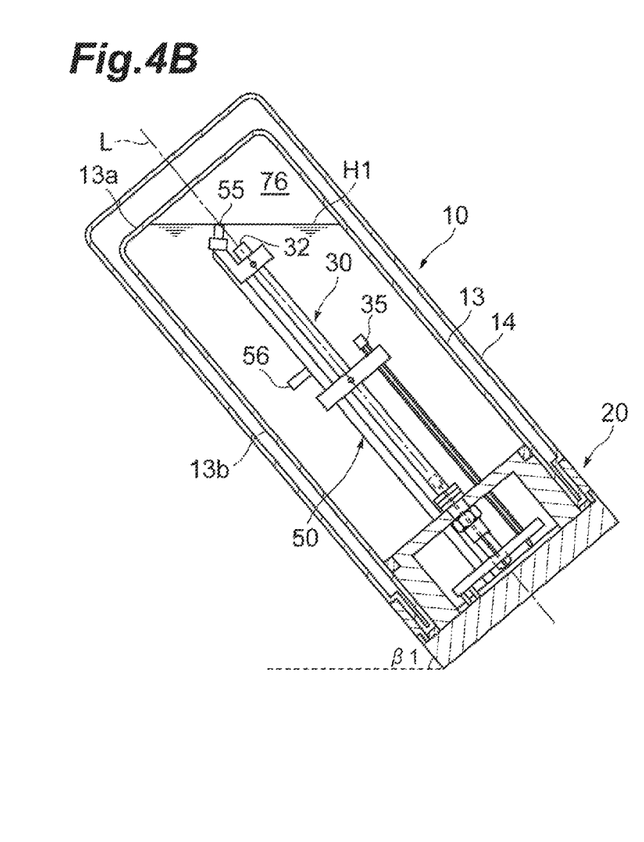

In addition, as illustrated in FIG. 4B, the container 10 may be inclined by an angle β1, for example, 40° with respect to the horizontal plane in an opposite direction to that of the above example. In this case, the distal end portion 32 of the heater 30 is located below the liquid level H1 of the washer fluid passing through the first outlet 55. That is, the distal end portion 32 of the heater 30 is located below the liquid level H1 formed along the horizontal plane passing through the first outlet 55 regardless of a direction in which the container 10 is inclined.

In addition, even when the container 10 of the heating device 3 is inclined, the space 76 formed above the horizontal plane passing through the first outlet 55 corresponds to 10% or more of the volume of the accommodation space A. When the container 10 is inclined, a shape of the space 76 corresponds to a shape obtained by obliquely cutting out a part of a ridge portion of a cylinder. Here, examples of a case in which the container 10 is inclined include a case in which the vehicle is inclined with respect to the horizontal plane and a case in which the container 10 is obliquely attached to the vehicle. For example, when the container 10 is obliquely attached at 25° with respect to the horizontal plane of the vehicle and the vehicle is further inclined by 25° with respect to the horizontal plane in the same direction, the container 10 is inclined by 50° in total with respect to the horizontal plane.

As illustrated in FIG. 3, the second outlet 56 functions as an outlet for the washer fluid when the container 10 is horizontally placed. A branch tube 53 is provided at the central portion 51 of the outflow pipe 50 in the extending direction. The branch tube 53 extends in a direction orthogonal to the central axis L, that is, a radial direction around the central portion of the accommodation space A in the direction of the central axis L. Arrangement of the tube included in the second outlet 56 is not restricted thereto. The branch tube 53 may communicate with the outflow pipe 50.

The second outlet 56 is an opening formed at a distal end of the branch tube 53, and is located between the central portion 33 of the heater 30 and a side wall 13b of the container 10. The second outlet 56 is located slightly on a side of the central portion of the accommodation space A in the direction of the central axis L. The second outlet 56 formed in the branch tube 53 communicates with the first outlet 55 through the outflow pipe 50 (the branch tube 53, the central portion 51, and the distal end portion 52).

The second outlet 56 is provided at a position separated from the side wall 13b. That is, the second outlet 56 is separated from the side wall 13b by a certain distance in the radial direction of the central axis L. The second outlet 56 is located at a position at which the washer fluid corresponds to 90% or less of the volume of the accommodation space A in the radial direction of the central axis L of the container 10. That is, when the container 10 is horizontally placed, a space 77 forming a portion of a cylinder which is formed by a horizontal plane passing through the second outlet 56 and the side wall 13b of the accommodation space A corresponds to 10% or more of the volume of accommodation space A. This space 77 corresponds to an air layer on an upper side of the washer fluid when the container 10 is horizontally placed.

Figure 5A:
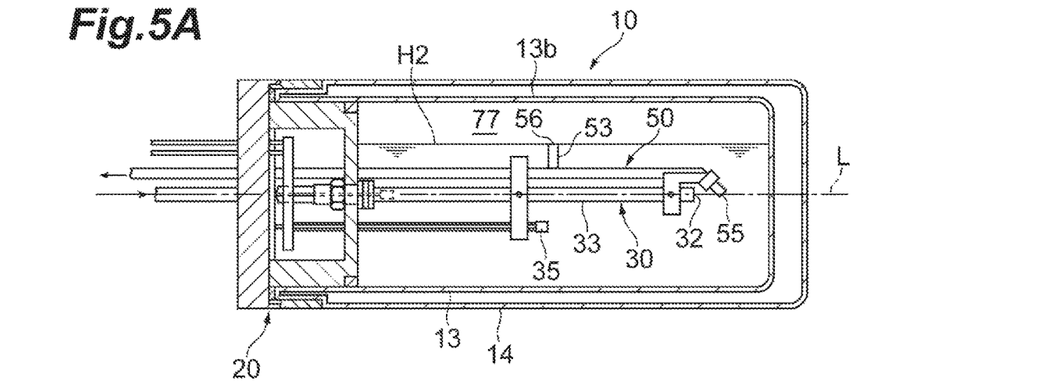
FIGS. 5A to 5C are cross-sectional views illustrating another example of the state in which the washer fluid heating device is inclined.

As illustrated in FIG. 5A, when the container 10 is horizontally placed, a liquid level H2 of the washer fluid stored in the accommodation space A of the container 10 substantially matches the horizontal plane passing through the second outlet 56. The liquid level of the washer fluid stored in the accommodation space A of the container 10 refers to a normal water level of the washer fluid when the washer fluid pump 2 is in an OFF state. The space 77 corresponding to 10% or more of the volume of the accommodation space A is formed between the liquid level H2 and the side wall 13b of the container 10.

Figure 5B:
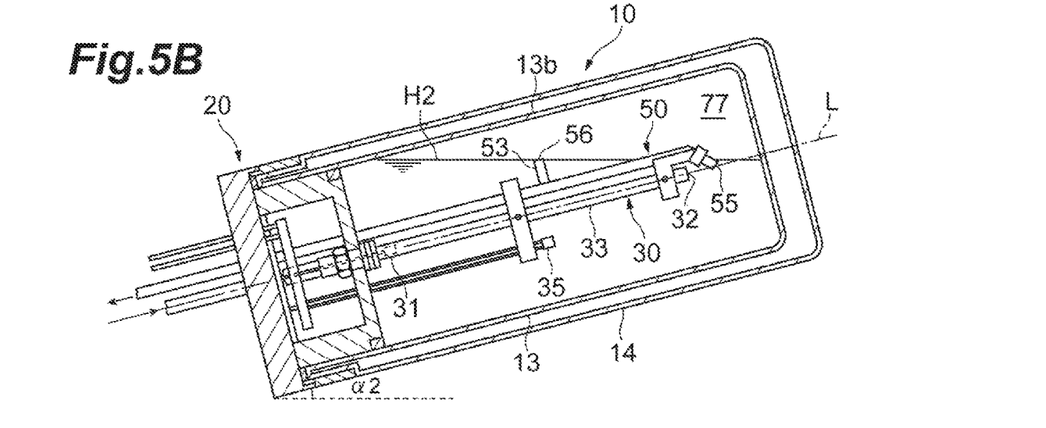

FIG. 5B illustrates a state in which the container 10 is inclined by an angle α2, for example, 15° with respect to the horizontal plane. In this case, the distal end portion 32 of the heater 30 is located below the liquid level H2 of the washer fluid and is not exposed from the liquid level H2 of the washer fluid. The liquid level H2 of the washer fluid may be maintained without change. However, the liquid level H2 of the washer fluid may be formed to pass through the second outlet 56 due to air entering the container 10. In this case, the distal end portion 32 of the heater 30 is located below the liquid level H2 of the washer fluid.

Figure 5C:
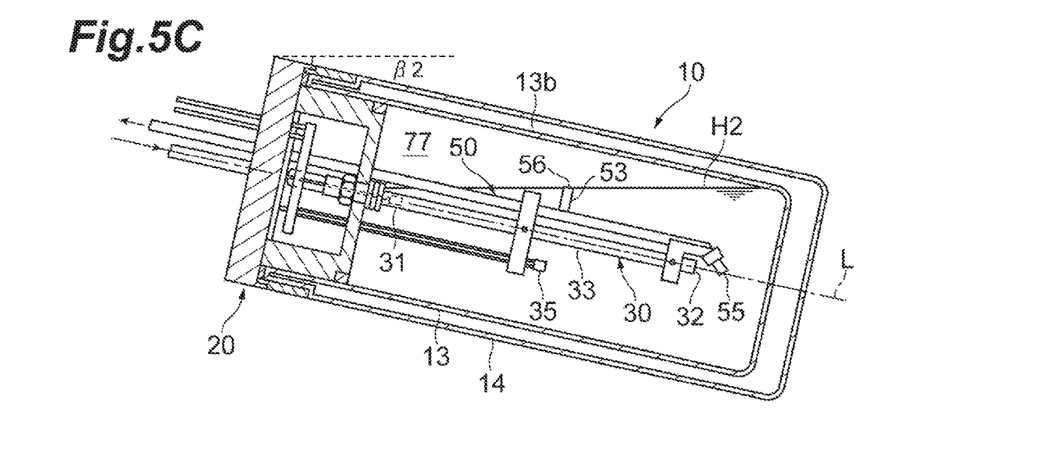

In addition, as illustrated in FIG. 5C, the container 10 may be inclined by an angle β2, for example, 15° with respect to the horizontal plane in an opposite direction to that of the above example. In this case, the proximal end portion 31 is present at a higher position than that of the distal end portion 32 in the heater 30. In this case, the proximal end portion 31 of the heater 30 is located below the liquid level H2 of the washer fluid passing through the second outlet 56. That is, the proximal end portion 31 of the heater 30 is located below the liquid level H2 formed along the horizontal plane passing through the second outlet 56 regardless of a direction in which the container 10 is inclined.

Then, even when the container 10 of the heating device 3 is inclined, the space 77 formed above the horizontal plane passing through the second outlet 56 corresponds to 10% or more of the volume of the accommodation space A. When the container 10 is inclined, a shape of the space 77 corresponds to a shape obtained by obliquely cutting out a part of a ridge portion of a cylinder. When the container 10 is horizontally placed, the second outlet 56 preferably faces upward in the vertical direction. Therefore, an index, etc. indicating a direction in which the branch tube 53 extends may be attached to the lid portion 20.

As described above, in the heating device 3, substantially the whole heater 30 is located below the liquid levels H1 and H2 of the washer fluid irrespective of a direction of the container 10. In other words, a portion of the heater 30 at a highest position is lower than the liquid levels H1 and H2. As a result, no-water burning is prevented. Further, since the spaces 76 and 77 are formed between the liquid levels H1 and H2 and the inner wall 13 of the container 10, damage to the container 10 is prevented even when the washer fluid freezes and expands.

Next, a description will be given of a method of operating the washer fluid supply system S using the washer fluid heating device 3 of the present embodiment. Hereinafter, a description will be given of a case in which the container 10 is vertically placed with reference to FIG. 1.

For example, the washer fluid heating device 3 is operated by a driver, etc. turning ON an ignition key. In this way, the washer fluid in the accommodation space A is heated to a desired temperature by the heater 30. Subsequently, when an operation command is sent to the washer fluid pump 2 by the driver, etc. operating the operation unit 6, the washer fluid stored in the washer fluid tank 1 is supplied to the washer fluid heating device 3 by the washer fluid pump 2 and flows into the accommodation space A of the heating device 3 through the inflow pipe 60 for the washer fluid (see a flow F1 of FIG. 1).

The washer fluid flowing into the accommodation space A successively lifts up the heated washer fluid present in the upper part of the accommodation space A as being heated while rising in the container 10. As a result, the heated washer fluid flows into the second outlet 56 and the first outlet 55 of the outflow pipe 50 disposed in the upper part of the accommodation space A (see a flow F2 of FIG. 1). When a level of the washer fluid is increased, the discharge pressure becomes lower than a pressure P1 and a pressure by the spring 9b of the check valve 9, and the flow F2 stops. In this way, a liquid level in the accommodation space A of the container 10 rises. Here, the pressure P1 is a pressure caused by a difference (height difference) between a height of the check valve 9 (more specifically, the ball 9c) and a height of the second outlet 56.

When the liquid level in the accommodation space A rises, an air pressure inside the container 10 increases and exceeds the pressure P1 and the pressure by the spring 9b of the check valve 9. As a result, the washer fluid in the outflow pipe 50 is discharged from the washer fluid nozzle 8 through the second pipe line 7b (see the flow F2 of FIG. 1). A pressure of the washer fluid pump 2 is made sufficiently strong to raise a jetting pressure from the washer fluid nozzle 8. Therefore, the liquid level in the container 10 further rises. In addition, in a state in which the liquid level passes beyond the first outlet 5, air remaining in the upper part of the container 10 may not be discharged and pushed by a pressure by the washer fluid pump 2.

The washer fluid in the container 10 is pushed toward the washer fluid nozzle 8 (see the flow F2 of FIG. 1). When the washer fluid pump 2 is stopped, a pressure in the upper part of the container 10 is released. The washer fluid is pulled in a direction of the container 10 due to a difference between a liquid level of the container 10 and a liquid level in the washer fluid tank 1 (pressure P2 of FIG. 1) (see a flow F3 of FIG. 1). However, the check valve 9 operates, and movement of the washer fluid stops and stabilizes. As a result of such a series of operations, a warmed washer fluid is supplied to the front windshield of the vehicle.

Here, the distal end portion 32 of the heater 30 is located below the horizontal plane passing through the first outlet 55 in the accommodation space A that contains the washer fluid. That is, the heater 30 is located below a lowest liquid level among liquid levels that may be formed in the accommodation space A. Therefore, even when the washer fluid heating device 3 is tilted, the heater 30 is submerged in the washer fluid. As a result, occurrence of a steaming phenomenon is prevented. The steam phenomenon will be described. When the heating means is overheated in a state in which a part of the heater 30 (the distal end portion 32, etc.) is exposed from the liquid level of the washer fluid, steam of the washer fluid is generated. When the steam of the washer fluid is sprayed from the washer fluid nozzle 8, the steam is cooled around the washer fluid nozzle 8 to become white steam. This phenomenon is the steaming phenomenon. When the steaming phenomenon occurs, this phenomenon may be erroneously recognized as a failure of the vehicle, etc. However, occurrence of the steaming phenomenon is prevented in the supply system S. A similar operation method is implemented even when the container 10 is horizontally placed.

According to the washer fluid heating device 3 described above, the outflow pipe 50 disposed on the accommodation space A has the first outlet 55 and the second outlet 56. The first outlet 55 is provided between the end wall 13a of the container 10 and the heater 30. Thus, when the container 10 is vertically placed, a position of the first outlet 55 is higher than a position of the second outlet 56, and air above the first outlet 55 does not flow out. As a result, exposure of the heater 30 is prevented by the liquid level H1 formed around the first outlet 55. Therefore, no-water burning is prevented. In addition, in this case, since the first outlet 55 is provided at a position separated from the end wall 13a, the space 76 is formed between the liquid level H1 and the end wall 13a. Therefore, damage to the container 10 is prevented even when the washer fluid in the accommodation space A freezes and expands. Further, since the second outlet 56 is provided between the side wall 13b of the container 10 and the heater 30, the position of the second outlet 56 is higher than the position of the first outlet 55 and air above the second outlet 56 does not flow out when the container 10 is horizontally placed. As a result, exposure of the heater 30 is prevented by the liquid level H2 formed around the second outlet 56. Therefore, no-water burning is prevented. In addition, in this case, since the second outlet 56 is provided at a position separated from the side wall 13b, the space 77 is formed between the liquid level H2 and the side wall 13b. Therefore, damage to the container 10 is prevented even when the washer fluid in the accommodation space A freezes and expands. As described above, according to the above-described washer fluid heating device 3, a degree of freedom may be assigned to the direction of the installed container 10, and damage at the time of freeze may be prevented. According to the heating device 3, installation restriction of the device and restriction due to inclination of the vehicle are greatly alleviated. Therefore, setting of the vehicle is easily examined, and examination time is shortened. Mounting flexibility with respect to a vehicle having a tight space such as a small vehicle is improved.

In addition, when the first outlet 55 is provided around the distal end portion 32 of the heater 30, and the container 10 is vertically placed and used, the liquid level H1 is easily formed at a higher position than that of the heater 30 even when the container 10 is further tilted due to, for example, inclination of the vehicle or a road. Therefore, exposure of the heater 30 is prevented.

In addition, when the second outlet 56 is provided between the central portion 33 of the heater 30 and the side wall 13b, and the container 10 is horizontally placed and used, the liquid level H2 is easily formed at a higher position than that of the heater 30 even when the container 10 is further tilted due to, for example, inclination of the vehicle or the road. Therefore, exposure of the heater 30 is prevented.

In addition, since the first outlet 55 is provided such that the space 76 formed between the horizontal plane passing through the first outlet 55 and the end wall 13a corresponds to 10% or more of the volume of the accommodation space A, damage to the container 10 is reliably prevented even when the washer fluid in the accommodation space A freezes and expands at the time of vertically placing and using the container 10.

In addition, since the second outlet 56 is provided such that the space 77 formed between the horizontal plane passing through the second outlet 56 and the side wall 13b corresponds to 10% or more of the volume of the accommodation space A, damage to the container 10 is reliably prevented even when the washer fluid in the accommodation space A freezes and expands at the time of horizontally placing and using the container 10.

Figure 6A:
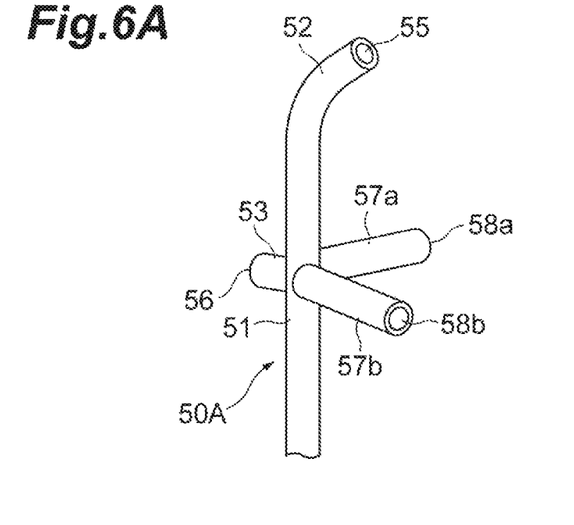
FIGS. 6A and 6B are diagrams illustrating another example of an outflow pipe.
Figure 6B:
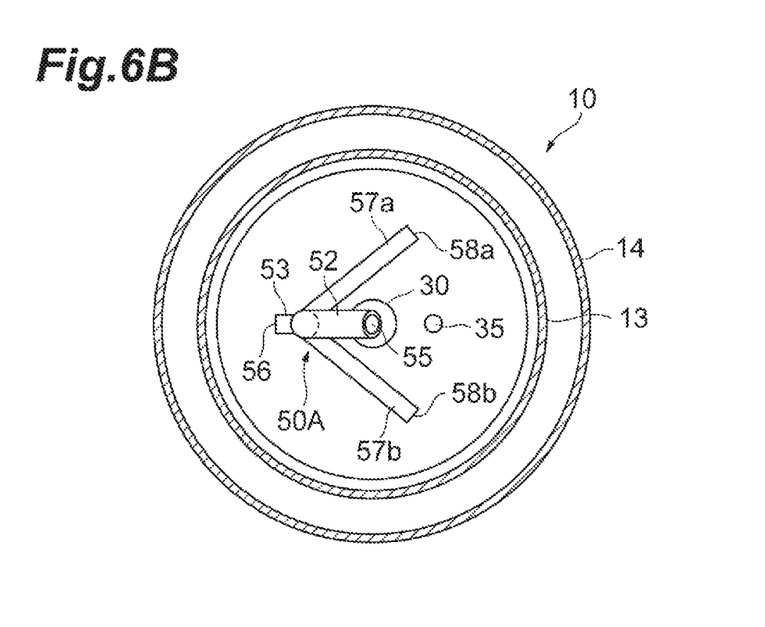

Hereinbefore, the embodiment of the present disclosure has been described. However, the invention is not restricted to the above embodiment. For example, the second outlet 56 may not be open only in one direction unlike the above embodiment. As illustrated in FIG. 6A and FIG. 6B, it is possible to include an outflow pipe 50A having two linear branch tubes 57a and 57b and additional outlets (second outlets) 58a and 58b formed at distal ends of the branch tubes 57a and 57b in addition to the second outlet 56 (or instead of the second outlet 56). In this case, the branch tubes 57a and 57b may be provided at substantially the same height (the same position in the direction of the central axis L) as that of the branch tube 53. The branch tubes 57a and 57b branch from the central portion 51 or the branch tube 53. The second outlet 56, the additional outlet 58a, and the additional outlet 58b may be formed to be located on the same circumference centered on the central axis L. According to the outflow pipe 50A, there is no restriction on a direction in which the container 10 is attached round the central axis L, and a degree of freedom of attachment of the container 10 is improved.

Figure 7A:
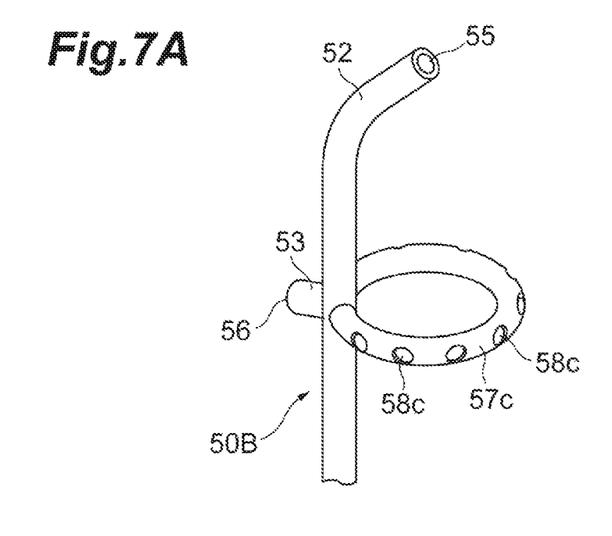
FIGS. 7A and 7B are diagrams illustrating still another example of the outflow pipe.
Figure 7B:
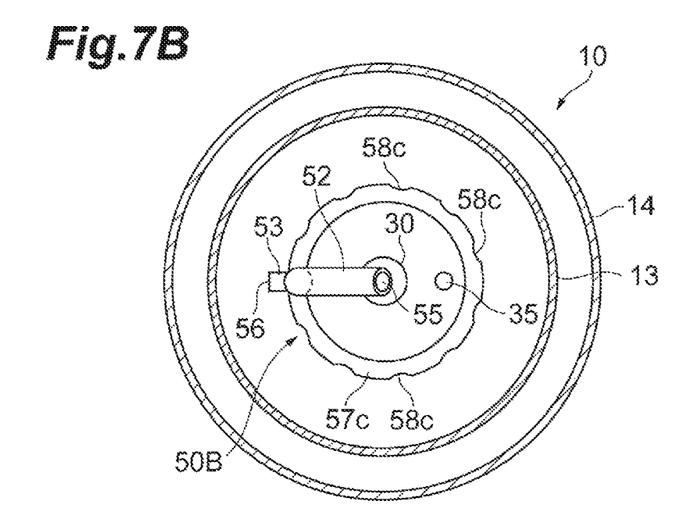

Alternatively, as illustrated in FIG. 7A and FIG. 7B, it is possible to include an outflow pipe 50B having one annular branch tube 57c and a plurality of additional outlets (second outlets) 58c formed on an outer peripheral surface of the branch tube 57c in addition to the second outlet 56 (or instead of the second outlet 56). In this case, the branch tube 57c may be provided at substantially the same height (the same position in the direction of the central axis L) as that of the branch tube 53. The branch tube 57c branches from the central portion 51 or the branch tube 53 and forms a circular shape centered on the central axis L. The second outlet 56 and the plurality of additional outlets 58c may be formed to be located on the same circumference centered on the central axis L. According to the outflow pipe 50B, there is no restriction on a direction in which the container 10 is attached round the central axis L, and a degree of freedom of attachment of the container 10 is improved.

In the above embodiment, the outflow pipe 50 is fixed by a fixing member attached to the heater 30. However, the fixing member may not be included when the outflow pipe 50 is made of a hard material, etc.

In addition, even though the heater 30 is disposed such that the axis of the heater 30 is located on the central axis L of the container 10 in the above embodiment, the invention is not restricted to the embodiment. For example, the heater 30 may be obliquely mounted with respect to the central axis L of the container 10.

The first outlet 55 may not be located on the central axis L of the container 10. The second outlet 56 may not be provided at the central portion of the heater 30 in the extending direction, and may be provided in every region around the heater 30. The volumes of the space 76 and the space 77 are not restricted to 10% or more of the volume of the accommodation space A, and may be less than 10% thereof.

INDUSTRIAL APPLICABILITY

According to the present disclosure, it is possible to assign a degree of freedom to a direction of an installed container and prevent damage at the time of freeze.

REFERENCE SIGNS LIST

10 . . . container, 13a . . . end wall (second end), 13b . . . side wall, 20 . . . lid portion, 30 . . . heater (heating unit), 31 . . . proximal end portion, 32 . . . distal end portion, 33 . . . central portion, 50 . . . outflow pipe, 55 . . . first outlet, 56 . . . second outlet, 58a, 58b . . . additional outlet (second outlet). 76 . . . space, 77 . . . space, A . . . accommodation space, L . . . central axis, S . . . supply system

The invention claimed is:
1. A washer fluid heating device comprising:
a container that contains a washer fluid, the container having a central axis, a first end in a direction of the central axis, a second end opposite to the first end, a side wall formed between the first end and the second end, and an accommodation space for the washer fluid;
a lid portion attached to the first end of the container to face the accommodation space;
a heater that has a proximal end portion attached to the lid portion, a central portion located at an approximate center of the container, and a distal end portion that extends from the central portion toward the accommodation space; and
an outflow pipe located in the accommodation space to allow the washer fluid in the accommodation space to flow out, wherein the outflow pipe comprises
a first outlet located at a first position between the second end of the container and the distal end portion of the heater, the first position being separated from the second end, and
a second outlet located at a second position between the side wall of the container and the central portion of the heater, the second position being separated from the side wall.

2. The washer fluid heating device according to claim 1, wherein a line obtained by projecting the distal end portion of the heater in the direction of the central axis intersects the first position.

3. The washer fluid heating device according to claim 1, wherein when the container is installed such that the central axis extends along a vertical direction, the first outlet is located such that a space formed between a horizontal plane passing through the first outlet and the second end corresponds to 10% or more of a volume of the accommodation space.

4. The washer fluid heating device according to claim 1, wherein when the container is installed such that the central axis extends along a horizontal direction, the second outlet is located such that a space formed between a horizontal plane passing through the second outlet and the side wall corresponds to 10% or more of a volume of the accommodation space.

5. The washer fluid heating device according to claim 1, wherein the outflow pipe extends parallel to the central axis and a distal end portion of the outflow pipe having the first outlet extends so as to be inclined with respect to the central axis.

6. The washer fluid heating device according to claim 1, wherein the outflow pipe is offset from the central axis, and the first outlet is located between the distal end portion of the heater and the second end of the container in the direction of the central axis.

7. The washer fluid heating device according to claim 1, wherein the heater comprises a straight heating pipe including the proximal end portion, the central portion and the distal end portion.

8. The washer fluid heating device according to claim 7, wherein the proximal end portion, the central portion and the distal end portion are located on the central axis.

9. The washer fluid heating device according to claim 1, wherein when the container is installed such that the central axis extends along a vertical direction, the first outlet allows the washer fluid in the accommodation space to flow out.

10. The washer fluid heating device according to claim 9, wherein the distal end portion of the heater is located below the first outlet in the vertical direction.

11. The washer fluid heating device according to claim 10, wherein an imaginary horizontal plane passing through the first outlet substantially comprises a liquid level of the washer fluid, and the distal end portion of the heater is located below the liquid level.

12. The washer fluid heating device according to claim 1, wherein when the container is installed such that the central axis extends along a horizontal direction, the second outlet allows the washer fluid in the accommodation space to flow out.

13. The washer fluid heating device according to claim 12, wherein the distal end portion of the heater is located below the second outlet in the horizontal direction.

14. The washer fluid heating device according to claim 13, wherein an imaginary horizontal plane passing through the second outlet substantially comprises a liquid level of the washer fluid, and the distal end portion of the heater is located below the liquid level.

15. The washer fluid heating device according to claim 1, wherein the second position is separated from both of the side wall and the central portion of the heater.

* * * * *